UNITED STATES PATENT OFFICE 2,500,025

ACYLAMINO STYRENE POLYMERS

Joseph B. Dickey and Theodore E. Stanin, Rochester, N. Y., assignors to Eastman Kodak Company, Rochester, N. Y., a corporation of New Jersey No Drawing. Application March 7, 1945,
Serial No. 581,567

6 Claims. (Cl. 260—85.5)

This invention relates to resins derived from acylamino styrenes either polymerized or copolymerized, which resins are particularly useful for the spinning of textile fibers.

It has been previously recognized that styrene polymerizes to give resins having good strength. It has also been recognized that when styrene is polymerized with a small amount of acrylic acid nitrile that the heat stability of the resulting product is slightly higher than that of polymerized styrene. Fibers prepared from styrene resins, such as of the type mentioned give fibers that have good strength and stretch, but these fibers have been found to be poorly resistant to elevated temperatures both in the presence of water and under dry conditions.

One object of our invention is to provide polymers of the styrene type in which the heat resistance is considerably greater than that which is ordinarily met with in polymeric styrene products. Other objects of our invention will appear herein.

We have found that the heat resistance of the polymers and copolymers of styrene can be considerably enhanced by introducing into the styrene molecule one or more acylamino groups. Various acid groups which may be used are acetyl, propionyl, carbamide, quanidino, ω-carboxyamidoacetyl, β-methoxyacetyl, lactyl

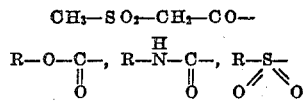

In these groups, R is a group selected from alkyl, aryl, and heterocyclic (tetrahydrofurfuryl) groups and these groups may have substituents thereon, the ring of the styrene may also have other substituents thereon, such as halogen (F, Cl, Br), hydroxy, alkyl, alkoxy, phenyl and the like. The —C=C— group of the styrene may have other substituents lower than hydrogen, such as alkyl, acyloxy, or acylamino groups.

The acylamino styrenes may in accordance with out invention be either polymerized or they may be copolymerized with vinyl compounds, using one of the various polymerization procedures described in the prior art. The polymerization may be carried out en masse, by a bead polymerization, in the form of a dispersion or solution under normal pressure conditions or under pressure conditions ranging from normal up to 5000 atmospheres or more. The polymerization may be initiated by one or more of the common polymerization promoters, such as by light, heat, oxygen, pressure, organic and inorganic peroxides or some combination of the above. If desired, one of the commonly known polymerization agents, such as boron triphosphate, tin chloride, or aluminum chloride may be employed.

The acylamino styrene may be prepared by any method commonly employed to prepare acylamino compounds which will not interfere with the unsaturated bond. A satisfactory method of preparing these compounds is by first preparing the amino styrene as described by Sabetay, Bleger and Lestrange, Bull. Soc. Chim., 49, 3 (1931). The amino compounds thus prepared may be acylated by using any of the common methods for introducing acyl groups into amines. For instance, acetyl groups may be incorporated by boiling the amino styrene with acetic acid.

If it is desired to prepare the copolymer, the acylamino styrene may be polymerized with a vinyl monomer, preferably in small proportion, such as up to 20% of the total mixture. Some of the polymerizable monomers, both vinyl and nonvinyl which may be employed for copolymerizing with acylamino styrene are the following: ethylene, iso-butylene, vinyl acetate, vinyl methyl ketone, vinyl chloride, vinyl fluoride, vinylidine difluoride, vinylidine dichloride, vinylidine, fluoride chloride, styrene vinyl methyl ether, β-cyanovinylmethyl ether, vinyl-β-cyanoethyl ether, vinylmethylsulfone and sulfoxide, methyl acrylate,

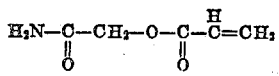

methyl fumarate, fumaramide, acrylic acidamides, acrylonitrile crotononitrile, vinyl urethane, fumaronitrile, β-cyanocrylic acidamides, β-cyanoalkyl acrylates and the like. For the preparation of fibrous materials, acrylonitrile has been found to be of value, and, therefore, this material is preferred for copolymerizing with the acylamino styrenes, for the making of fibers. In preparing polymers, one or more of the above monomers may be copolymerized with one or more of the acylamino styrenes in any desired amount. For instance, in some cases equal parts of the vinyl monomer and the acylamino styrene prove to be satisfactory. In other cases, but a small proportion, such as 10–30% of acylamino styrene is sufficient to give the desired results. The following examples illustrate the preparation of resins in accordance with our invention:

*Example 1.*—Sixteen parts of p-acetamino styrene were mixed with 6 parts of acrylonitrile and 0.02 part of benzoyl peroxide and the whole was heated in a sealed tube for 2 days at 50° C. The tube was allowed to cool and was opened and a tough, solid product was obtained. This material was purified by dissolving in pyridine and pouring into water. Fibers may be obtained from this polymer by spinning in acetone solution thereof. In this polymerization, it is helpful to expose the tube to ultraviolet light in addition to the heating operation.

*Example 2.*—Twenty-six parts of a mixture of o-, m-, and p-benzene-sulfonamido styrenes were mixed with 18 parts of acrylonitrile and 0.03 part of benzoyl peroxide and the mass was polymerized as in the preceding example. The polymer was worked up as in the preceding example.

*Example 3.*—Nineteen parts of

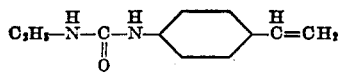

were mixed with 10 parts of methyl acrylate and 5 parts of N-propylacrylamide, and 0.03 part of a mixture of benzoyl peroxide and acetyl peroxide was incorporated. Polymerization was started at a temperature of 40° C. and slowly raised to 75° C. over a period of several days. The product which was purified in the same manner as used for the product of Example 1 was found to be suitable for spinning fibers preparing films, and the like.

*Example 4.*—Twenty parts of p-methane sulfonylamino styrene were mixed with 20 parts of methyl vinyl ketone and 0.03 part of benzoyl peroxide. The mass was heated together at 50° C. for several days in a sealed tube and then slowly raised to 75° C. The product obtained is hard and tough and adapted for the preparation of films, fibers, molded products and the like.

*Example 5.*—Five parts of

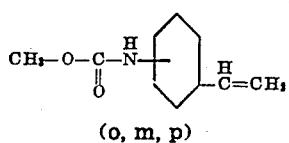

(o, m, p)

were mixed with 25 parts of vinyl chloride and 0.01 part of benzoyl peroxide, and the mass was heated at 50° C. in an autoclave containing nitrogen under 300 atmospheres pressure. After two days the temperature was slowly raised to 75° C. After cooling, the product was removed with pyridine and precipitated by pouring into water.

*Example 6.*—Ten parts of p-propionylamino styrene were mixed with 60 parts of vinyl chloride, 8 parts of vinyl acetate, and 0.05 part of benzoyl peroxide in a closed vessel. The vessel was heated and beginning at 30° C. polymerization appeared to start. The temperature was slightly raised to 80° C. A slightly yellow tough solid resulted which was purified in the manner described in Example 1. This polymer was suitable for spinning fibers, preparing films, molding and the like. Instead of vinyl chloride, vinyl fluoride may be employed and in place of the styrene derivative p-propionylamino-α-acetoxy styrene may be employed.

*Example 7.*—Five parts of

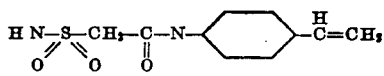

50 parts of vinylidine dichloride, 1 part of acrylonitrile, 0.1 part of benzoyl peroxide, 20 parts of water, and 0.4 part of gum arabic were all mixed together in a glass container having about 10% free space, and the whole was tumbled at 50 R. P. M. while maintaining a temperature of approximately 50° C. Polymerization was continued until complete, and the resulting product was removed in the form of beads. If desired, in this instance the polymerization could be carried out in an agitated pressure vessel, the pressure being supplied by pumping in an inert gas, such as nitrogen or methane. In the above example vinylidine chloride fluoride or difluoride may be used instead of the dichloride.

*Example 8.*—Two parts of p-acetylamino styrene, 2 parts of

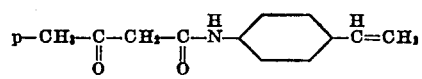

31 parts of styrene, 0.5 part of urea peroxide, 55 parts of water, 0.9 part of gelatin, 0.05 part of 2-ethylhexanol, 0.18 part of Nekal A (sodium ethyl naphthalene sulfonate), and 0.067 part of carbon tetrachloride were thoroughly mixed together to form an emulsion, and the mixture was agitated for 3–4 days within the range of 50–60° C. The polymer obtained was precipitated by adding dilute hydrochloric acid and was then filtered, washed, and dried.

*Example 9.*—Five parts of

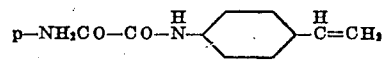

16.2 parts of butadiene, 2 parts of fumaronitrile, 0.5 part of urea peroxide, 0.9 part of gelatin, 0.05 part of 2-ethylhexanol, 0.07 part of carbon tetrachloride, and 0.2 part of Nekal A (sodium ethyl naphthalene sulfonate) were emulsified and shaken for 3–5 days at 50–60° C. The polymer obtained was precipitated by adding dilute hydrochloric acid and hydroquinone was added to destroy the catalyst. The resulting yellowish polymer was filtered off, washed, and dried. A tough solid was obtained which is useful to prepare fibers, films, etc. Instead of butadiene, a butadiene derivative might be employed, such as 1- or 2-chlorobutadiene, 1- and 2-acetoxybutadiene, 2-methyl-3-chlorobutadiene, or the like.

*Example 10.*—Five parts of butyrylamino styrene were placed in a shaking autoclave and ethylene was pumped in until a pressure of 1500 atmospheres was reached. The reaction mixture was then heated at 180° C. for 20–25 hours, cooled, and the reaction product removed. In place of ethylene, a higher homologue thereof, such as propylene, iso-butylene, or the like may be employed.

*Example 11.*—Ten parts of p-acetylamino styrene were mixed with 20 parts of vinyl acetate and 20 parts of vinylidine dichloride and the mixture was heated in a sealed tube with 0.05 part of benzoyl peroxide at 50° C. for several days. The resulting polymer obtained was a tough solid suitable for spinning into filaments, preparing films, or the like.

*Example 12.*—A mixture of 5 parts of o-acetylamino styrene, 5 parts of methyl acrylate, 5 parts of methyl fumarate, and 5 parts of methyl vinyl sulfone were heated in a sealed tube with 0.05 part of benzoyl peroxide as described in the preceding example. The product obtained was slightly yellow but was a material which could be employed for making up various products, particularly by molding.

*Example 13.*—Ten parts of p-acetylamino styrene, 10 parts of p-(p-tolylsulfoneamido)-styrene and 0.01 part of benzoyl peroxide were dissolved in acetic acid and the mass was slightly heated up to 150° C. over a period of several days. The mixture was then cooled and purified as explained in preceding examples. A yellowish, high-melting solid was obtained.

*Example 14.*—Ten parts of

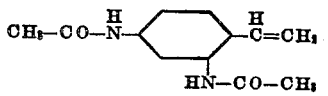

20 parts of vinyl methyl ether and 50 parts of styrene were mixed together and heated in a sealed tube at 50° C. with 0.04 part of benzoyl peroxide using a time of 2 days. When cool, the tube was opened and a tough solid product was obtained. The product was purified by dissolving in a solvent such as pyridine and pouring into water.

We claim:

1. A polymer resulting from the copolymerization of p-acetylamino styrene and acrylonitrile the acetylamino styrene being between approximately 9% and approximately 75% by weight of the whole.

2. A polymer useful for the spinning of textile fibers resulting from the copolymerization of an acylamino styrene, the acylamino being attached to the ring and acrylonitrile, the acylamino styrene being between approximately 9% and 75% by weight of the whole.

3. A polymer useful for the spinning of textile fibers essentially consisting of the copolymer of an acylamino styrene, the acylamino being attached to the ring and an unsaturated compound having only one carbon-to-carbon double bond linkage therein, the acylamino styrene being between approximately 9% and 75% by weight of the whole.

4. A polymer useful for the spinning of textile fibers essentially consisting of the copolymer of an acylamino styrene, the acylamino being attached to the ring and an acrylic acid compound having only one carbon-to-carbon double bond linkage therein, the acylamino styrene being between approximately 9% and 75% by weight of the whole.

5. A method of preparing resins eminently suitable for use in the spinning of textile fibers which comprises heating a mixture of an acylamino styrene, the acylamino being attached to the ring, and an unsaturated polymerizable organic monomer having only one carbon-to-carbon double bond linkage therein in the presence of a peroxide polymerization catalyst, the acylamino styrene being between approximately 9% and 75% by weight of the whole.

6. A method of preparing polymers suitable for the spinning of textile fibers therefrom which comprises heating a mixture of acylamino styrene, the acylamino being attached to the ring, and acrylonitrile in the presence of a peroxide polymerization catalyst, the acylamino styrene being between approximately 9% and 75% by weight of the whole.

JOSEPH B. DICKEY.
THEODORE E. STANIN.

REFERENCES CITED

The following references are of record in the file of this patent:

UNITED STATES PATENTS

| Number | Name | Date |
|---|---|---|
| 2,306,410 | Schinzel | Dec. 29, 1942 |